Sept. 4, 1956 O. B. STRAM 2,761,513

ROTARY TAPE PUNCH HAVING SELECTIVELY ACTUABLE PERFORATING MEANS

Filed Sept. 20, 1952 2 Sheets-Sheet 1

INVENTOR
OSCAR B. STRAM
BY
Laurence R. Brown
ATTORNEY

INVENTOR
OSCAR B. STRAM
BY
Laurence R. Brown
ATTORNEY

United States Patent Office 2,761,513

Patented Sept. 4, 1956

2,761,513

ROTARY TAPE PUNCH HAVING SELECTIVELY ACTUABLE PERFORATING MEANS

Oscar B. Stram, Philadelphia, Pa., assignor to Burroughs Corporation, Detroit, Mich., a corporation of Michigan Application September 20, 1952, Serial No. 310,599

8 Claims. (Cl. 164—111)

This invention relates to coded electrical signal recording apparatus, and more particularly it relates to marking apparatus for impressing code symbols on a movable tape.

It is customary in impressing symbols on tape in response to coded electrical signals to perforate or otherwise mark the tape at a position along a drum or roller which advances the tape step by step. In this type of prior art apparatus the tape has been stopped before the perforating or marking action is effected to prevent smearing of the symbols or tearing of the tape. However, such operation may necessitate expensive ratcheting equipment and limits the speed at which the code may be recorded on the tape.

It is therefore, a general object of the present invention to improve and simplify tape marking apparatus operable in response to coded electrical signals.

It is a further object of the invention to increase the speed of tape marking devices by impressing a code marking upon the tape while it is continuously advanced.

It is another object of the invention to provide high speed tape punching apparatus which provides clearly defined tape perforations symbolic of coded electrical symbols.

In accordance with the present invention therefore, two continuously rotating rollers are supplied for advancing the tape, and selectively actuable tape marking means is provided rotatable with one of the rollers so that the tape may be marked as it is advancing.

A more detailed description of the invention is presented hereinafter in conjunction with the embodiments illustrated in the accompanying drawing, in which.

Figure 1:
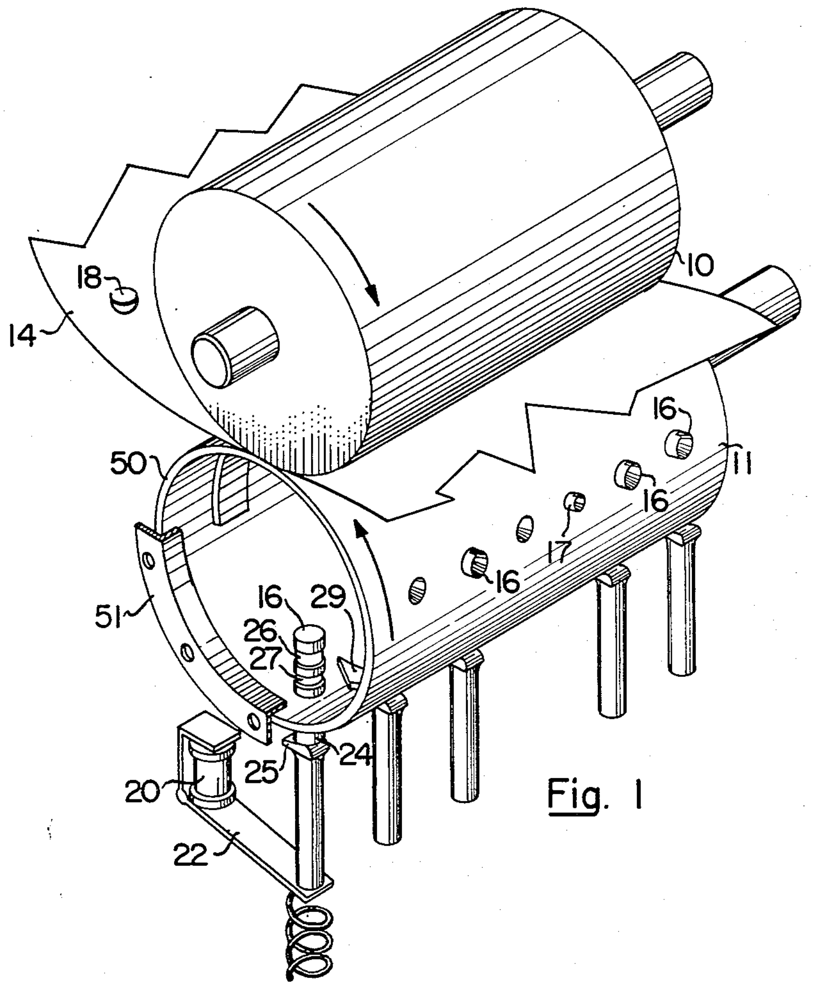
Fig. 1 is a perspective view of apparatus constructed in accordance with one embodiment of the invention.

Referring now in particular to Fig. 1 of the drawing, rotary tape punching apparatus is shown comprising a pair of cylindrical drums 10 and 11 adapted for rotation in contact with each other along a portion of each drum surface to thereby advance the tape 14. The lower roller is hollowed interiorly as shown and is provided with a plurality of punches 16 adapted for selective extension from the surface of the drum as it rotates in the vicinity of the tape 14. In this manner a rolling action occurs between the cutting surfaces of extended punches and the tape to cleanly punch a suitable coded marking indicia in the tape.

It has been found that when the upper drum 10 is constructed with an outer surface of a semi-resilient plastic material such as nylon or teflon, it provides a highly desirable base against which the punches co-act to cleanly perforate the tape. Due to the resiliency of the drum 10 the punches tend to form their own die in the drum through repeated operations and thereby do away with the need of pre-forming a die in the drum. The punches 16 may be hollow and open ended to define a C-shaped cutting surface adapted to perforate the tape without disconnecting the resulting flap 18 from the tape. This type of perforation known in the art as "chadless tape" perforation is desirable since it not only provides an easily read coding indicia which allows printed information to be typed on the tape along with the punching, but it prevents the accumulation of punchings which might tend to clog the rollers or punching apparatus. It is clear, therefore, that the drums need not be stopped during the tape advancing process by a ratchet mechanism. By perforating the tape in a continuous rotary motion, much higher tape advancing speeds are permitted than otherwise possible.

In order to code the tape, a suitable relay 20 is provided with an actuator arm 22 which in this embodiment bears against the exterior punch surface 24 to place it in either a perforating position extended from the drum surface 50 or an inactive position flush with the drum surface 50. It is readily recognized that suitable electrical means may be provided for actuating the coding punches in synchronism with the rotation of the drum. As the actuator arm 22 sets the pin 16 by means of the cam 25 in either one of two operating positions identified by the notches 26 and 27, the pin is retained in that position during further rotation of the drum by a track 29 which engages one of the grooves. The track does not rotate with the drum and therefore in its fixed position provides a bearing surface to keep the punches in place in the selected position until after the perforating action is completed. In this respect an open bearing 51 may be provided at one end of the drum to allow suitable fastening means to be inserted in the roller to anchor the track 29. Upon leaving the track 29 the punches 16 are forced into a protruding or punching position through the action of centrifugal force. The punches 16 remain in this position unless set in an inactive position by means of the relay controlled actuator arms 22 as hereinbefore described.

One of the punches may be made stationary, as the indexing punch 17, to help pull tape through the rollers and to indicate reference positions. It is easily recognized that several sets of punches may be provided about the periphery of the drum 11 so that drum speeds and coding speeds may be selected to suit any particular system to which the invention may be adapted.

Figure 2:
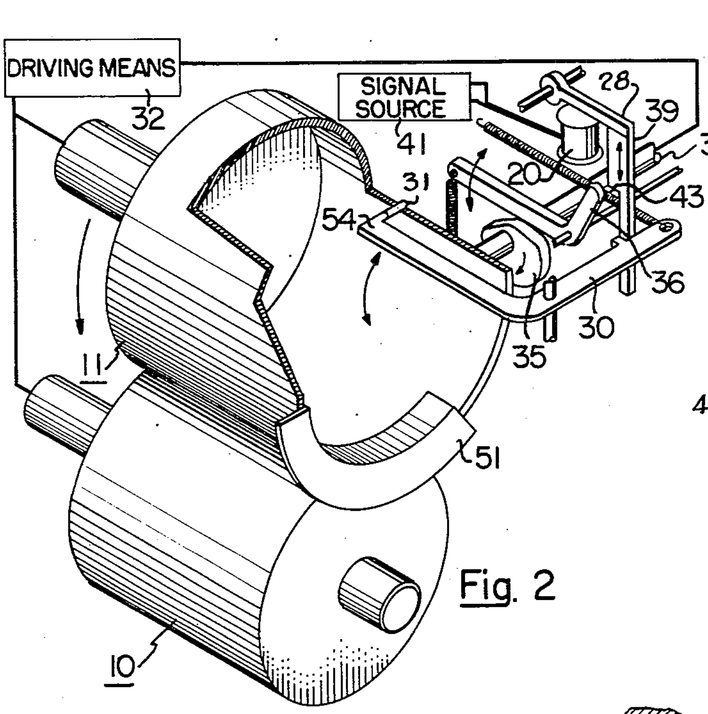
Fig. 2 is a combined schematic and partially broken away perspective view of a tape punching system constructed in accordance with the invention.

Although setting of the punches into operating position may be accomplished externally to the drum 11, as hereinbefore described, the actuating means is operable inside one of the drums as more clearly illustrated in the system embodiment of Fig. 2. Here it is assumed that the punches 31 may be set in either of the two positions aforedescribed by operation of the bell crank lever 30 extending inside the roller 11. A single driving means 32 such as a motor is geared to synchronously rotate both rollers as well as the actuated code selection apparatus comprising means such as connected with the shaft 34. A cam 35 on shaft 34 may be used to cause the actuating crank 36 to oscillate in the vicinity of the upper arm of the bell crank 30. Thus, by means of the interposer 39, the actuating crank 36 may cause the bell crank 30 to move at the time the pins are presented to the other end. The punch is therefore synchronously presented to the bell crank cam surface 54 as the drum 11 rotates.

The interposer 39 may be selectively actuated by the actuating arm 28 of a suitable relay 20 in response to signals from the signal source 41. The oscillation of the actuating crank 36 has such a magnitude that the bell crank arm 30 is not actuated until the bearing surface 43 of the interposer 39 is inserted between the bell crank and oscillating crank by the relay 20. Accordingly, the tape marking system may be directed by suitable electrical coding apparatus for coding while the tape is being advanced at high speed.

Figure 3:
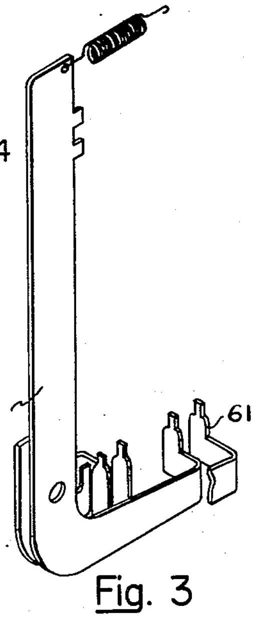
Fig. 3 is a partially broken away perspective view of a mechanism used in one embodiment of the invention.

In Fig. 2 only one bell crank 30 is shown, but an array of several bell cranks is used with the usual multi-element code. One arrangement of such cranks inside the roller is shown in Fig. 3. Considering the bell cranks 45 of Fig. 3 together with the mechanism of Fig. 4, it is readily seen that externally actuated selection apparatus may extend inside the opening 53 in the stationary assembly 52 inserted inside one end of the drum 11 to set the punches into proper position for applying a code marking indicia to the tape as it moves along the surface 50 of the roller. The vertical motion of the cam surface 61 of bell crank 45 is caused to place punching pins 37 or 37′ respectively into either the upper or lower groove 21 or 23, in accordance with this embodiment of the invention.

Figure 4:
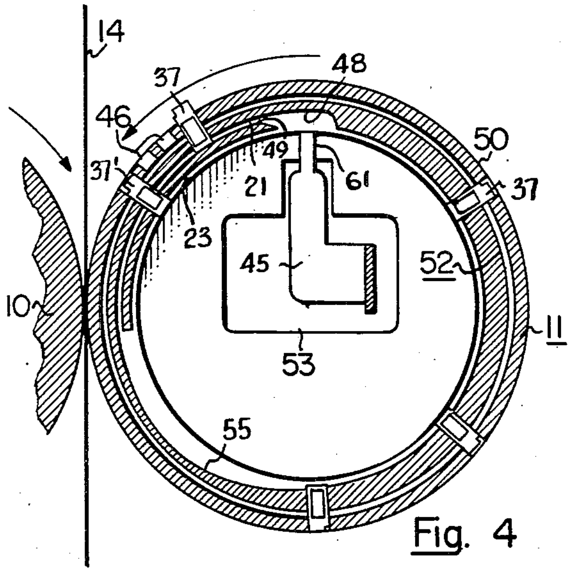
Fig. 4 is an elevation view partially in section of punching means constructed in accordance with the invention for marking tape.

The camming groove 21 holds the punch pins in their upper or outer positions as indicated by punch 37 in Fig. 4, after being placed there by the setting action of the bell crank cam surfaces 61, so that they will perforate the tape 14 after further rotation of the periphery 50 of the drum 11. The assembly 52 containing the camming grooves 21 and 23 is stationary and does not rotate with the drum periphery 50. Each pin 37 is carried along the groove 21 formed between the surfaces 48 and 49 until it projects through one of the apertures 46 in the drum surface 50 and is therefore carried around with the inner end riding in the camming grooves. Moreover, each pin 37 is projected through one of the apertures 46 in the drum surface or shell 50 and is therefore carried around with the inner end riding in the camming grooves. Therefore, upon further rotation of the drum, a selected pin 37 in the outer groove is channeled along with all other pins and punches the tape 14. After punching the tape each punch 37 is still carried along until it is retracted by action of the camming groove portion 55 so that after a complete rotation of the drum the normal pin path in the vicinity of the bell crank cam surface 61 will cause it to enter the inner groove 23 and travel about to position 37′. Accordingly, the code may be selected by means external to the roller drum, such as shown in the system of Fig. 2, to cause means inside the roller drum to selectively actuate corresponding punches. The camming assembly 52 of Fig. 4 may comprise a series of rings clamped together to provide a separate cam groove for different punches corresponding to a plurality of different code characters. Each punch is actuated by different bell crank arms in an array similar to that shown in Fig. 3.

Figure 5:
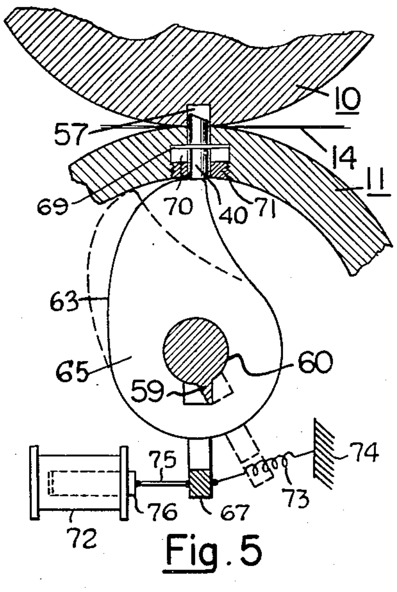
Fig. 5 is a partial sectional view of tape punching means constructed in accordance with a further embodiment of the invention.

Alternate camming apparatus such as shown in Fig. 5 may be provided for directly setting punches and holding them during the cutting action in response to actuation of motion of the bell crank 67. The camming surface 63 in this embodiment directly extrudes the punch in the vicinity of the contact of the drum surface with the tape.

The dotted position of the cam 65 illustrates the space position as contrasted to the mark position in which the punch 40 is extruded to mark the paper 14. A retainer ring 69 on the punch holds it in the drum 11 and it needs no spring retainer since the tape prevents extrusion unless held in place by the surface of the cam 63 during the cutting arc. To provide clearance for the movement of the ring 69, a recess 70 is provided in the drum around a portion of the punch 40. The entrance to the recess 70 may be partially closed by an apertured plug 71 threaded into the recess wall in order to prevent the ring and its retainer from dropping out when the drum 11 is not operating. When operative the punch is preferably received by a suitable matrix receptacle 57 in the face of the drum 10 to assure clearly marked perforations.

A key 59 may be used to define the limiting positions at which the cam 65 is set for spacing or marking by means of rotation about shaft 60 in response to motion of member 67 actuated from a suitable system outside the drum 11. Cam 65 by means of member 67 affixed thereto may be set in its two positions by means of a solenoid 72 and a spring 73. Link 75 is pivotally connected to one side of member 67 and at its other end to plunger 76 of solenoid 72. When the solenoid is energized in accordance with code signals received thereby, the plunger 76 is moved within the solenoid and cam 65, through member 67 and link 75, is moved to its marking position against the opposition of spring 73 which is pivotally connected to the opposite side of member 67. Spring 73 is connected at its other end to a fixed support as at 74 and resiliently urges cam 65 through member 67 to its space or non-marking position when the solenoid 72 is deenergized. As in the prior illustrated embodiments the tape may therefore be marked during continuous motion of the drums 10 and 11 if desired. Other embodiments may be readily provided by those skilled in the art in view of the teachings of this invention without departing from its spirit or scope.

Having therefore described the invention and its mode of operation, those features believed indicative of its nature are defined with particularity in the appended claims.

I claim:

1. Rotary tape punching apparatus comprising in combination, a pair of rotatable cylindrical drums positioned with a portion of each drum surface in contact with each other, a plurality of radially movable punches supported within apertures on the outer periphery of one of said cylindrical drums, a relatively staitonary camming assembly positioned in said punch supporting drum adjacent to the inner surface thereof, said camming assembly having two arcuate camming paths for selectively guiding the punches over orbital paths, one of the camming paths arranged on the side adjacent the contacting surface of the punch supporting drum and constructed to partially protrude a punch guided by the same for perforating a tape fed between the drums, the other of said camming paths having a smaller radius of curvature than said first camming paths and constructed to hold the punch guided by the same in retracted non-protruding condition, positioning means in said punch supported drum and operable to radially position said punches for guidance by either one or the other of said camming paths; and a single driving means for the drums and the positioning means.

2. Apparatus as defined in claim 1 wherein the positioning means comprises a bell crank member partially within and partially without the punch supporting drum, an electrical signal responsive relay including an energizable relay coil and an actuating arm, an interposer arm controlled by said relay actauting arm positioned adjacent the bell crank member, an oscillating member to urge the interposer arm in yielding contact with the bell crank member thereby actuating the latter.

3. Rotary punching apparatus comprising, in combination, a pair of cylindrical drums rotatable about parallel axes such that peripheral portions of the drums are in substantially line contact with one another, one of said drums having its peripheral surface formed of resilient material, the other of said drums being hollow and shaped to provide a cylindrical shell opened at least at one end thereof, a plurality of similar punches carried by the last mentioned drum and mounted in the shell thereof for substantially radially directed movement, each punch having a dimension in the direction of its movement greater than the thickness of said shell and having the inner end sections thereof projecting beyond the inner surface of the shell, a relatively stationary camming assembly inside of said shell having two arcuate camming tracks for each punch and arranged on the side of the shell immediately adjacent to the other drum, said camming tracks having different radii centered on the axis of rotation of the drum shell in which they are disposed, means carried by each punch and slidably engageable in either one or the other of said camming tracks to hold the punch at a given distance from its axis of rotation as it tranverses the line contact of the two drums, the outer camming track for each punch acting through said engaging means to hold its respective punch in projecting position relative to the peripheral surface of said shell for impressing the resilient surface of the other drum and for perforating a frangible medium fed between the drums, the inner camming track for each punch acting through said engaging means to hold its respective punch in a retracted non-perforating position, and means extending through an opened end of said shell and actuatable therein to radially shift the punches as they approach said line of contact so that the engaging means of each punch is selectively slidable in one or the other of the pair of camming tracks associated therewith.

4. High speed rotary tape punching apparatus for recording coded electrical signals on a continuously movable tape comprising in combination, a pair of continuously rotatable drums positioned with a portion of each drum surface in contact with the movable tape to impart continuous motion thereto, a plurality of radially movable punches supported within and projectable through apertures on the outer periphery of one of said cylindrical drums, stationary guide means positioned within said punch supporting drum and adapted to engage said radially positioned punches, positioning means adapted to be moved in the path of said punches to move said punches into engagement with said guide means, said guide means arranged to engage said punches in one radial position thereof to perforate said tape fed between said drums and to engage said punches in a second radial position thereof to guide said punches in a retracted non-punching position, and a continuously operating power source for rotating said drums and for actuating said positioning means, said drums and said positioning means being operated synchronously.

5. Apparatus as defined in claim 4 comprising, an electrical signal source for developing during the period of a predetermined rotation of said drums control signals associated with those of said punches which are to be radially positioned during said period in accordance with a predetermined code, means controlled by said control signals for coupling said power source to said positioning means, said means controlled by said control signals comprising a member adapted to be engaged and disengaged by power derived from said signal source, under control of a device operable by said control signals.

6. In an apparatus for perforating a tape in accordance with code signals received thereby comprising in combination, a pair of parallel rollers between which the tape is adapted to be advanced, means for connecting a power source to said rollers for continuously rotating the same, a plurality of punch pins carried by one of said rollers, each of said punch pins being mounted for radial movement independently of the other punch pins from a non-punching position within said roller to a punching position extending radially outwardly of the roller, relatively stationary arcuate guide means positioned concentrically within and of a smaller radius than said punch pin carrying roller, said guide means arranged to engage said punch pins in one radial position thereof to guide said punch pins in a projecting position for perforating said tape and to engage said punch pins in a second radial position to guide said punch pins in a retracted non-perforating position, an electrical signal source for developing during the period of a predetermined rotation of said rollers control signals associated with those of said punch pins which are to be radially positioned during said period in accordance with a predetermined code, a plurality of devices actuated by said control signals, a plurality of positioning members corresponding in number to said plurality of punch pins and cooperable with the plurality of punch pins and with said plurality of signal actuated devices, said positioning members being movable by said signal actuated devices for selectively positioning said punch pins radially as they are carried circumferentially in the punch pin carrying roller for engagement by said guide means in accordance with code signals received by said signal actuated devices.

7. In a high speed rotary tape punching apparatus for recording electrical signals on a continuously movable tape comprising in combination, a pair of parallel rollers between which the tape is adapted to be advanced, means for connecting a power source to said rollers for continuously rotating the same, a plurality of punches mounted for radial movement in one of said rollers, each of said punches mounted for radial movement independently of the other punches from a non-punching position within said roller to a punching position extending radially outwardly of said roller, retaining means for limiting the outward movement of said punches under the effect of centrifugal force, normally stationary cam means registerable with the inner ends of said punches to prevent inward movement of the punches at the position where the punches are presented to the tape passing between said rollers to effect a tape punching operation, and means for moving said cam means generally circumferentially with respect to the axis of rotation of said punch carrying roller so that said punches will be held against inward movement at a position circumferentially displaced with respect to said tape punching position and where the punches are ineffective to punch the tape.

8. In a high speed rotary tape marking apparatus for recording electrical signals on a continuously movable tape comprising, in combination; a pair of parallel rollers between which the tape is adapted to be advanced; means for connecting a power source to said rollers for continuously rotating the same; a plurality of marking elements carried by one of said rollers; each of said marking elements mounted for radial movement independently of the other marking elements from a non-marking position within said roller to a marking position extending radially outwardly of said roller; means limiting the outward movement of said marking elements beyond their radially projecting marking position; cam means in said roller carrying said marking elements and engageable with the inner ends of the elements to prevent inward movement thereof; means mounting said cam means for movement generally circumferentially with respect to the axis of rotation of said marking element carrying member from a position where the cam means is effective to prevent inward movement of the elements when the elements traverse the arc of their movement immediately adjacent to the other roller, whereby the elements are held in projecting relation to the periphery of their roller and act to mark the tape advancing between the rollers, to a position where the elements, although held by the cam means against inward movement, are at a location in their revolution where the marking elements are ineffective to mark the tape; and means for moving the cam means to the two positions of its movement.

References Cited in the file of this patent

UNITED STATES PATENTS

| | | |
|---|---|---|
| 515,927 | Stimpson | Mar. 6, 1894 |
| 762,321 | Keyes | June 14, 1904 |
| 1,271,727 | Krauth | July 9, 1918 |
| 1,691,917 | Braitmayer | Nov. 20, 1928 |
| 2,392,275 | Tholstrup | Jan. 1, 1946 |
| 2,619,177 | Praturlon | Nov. 25, 1952 |